Patented July 30, 1929.

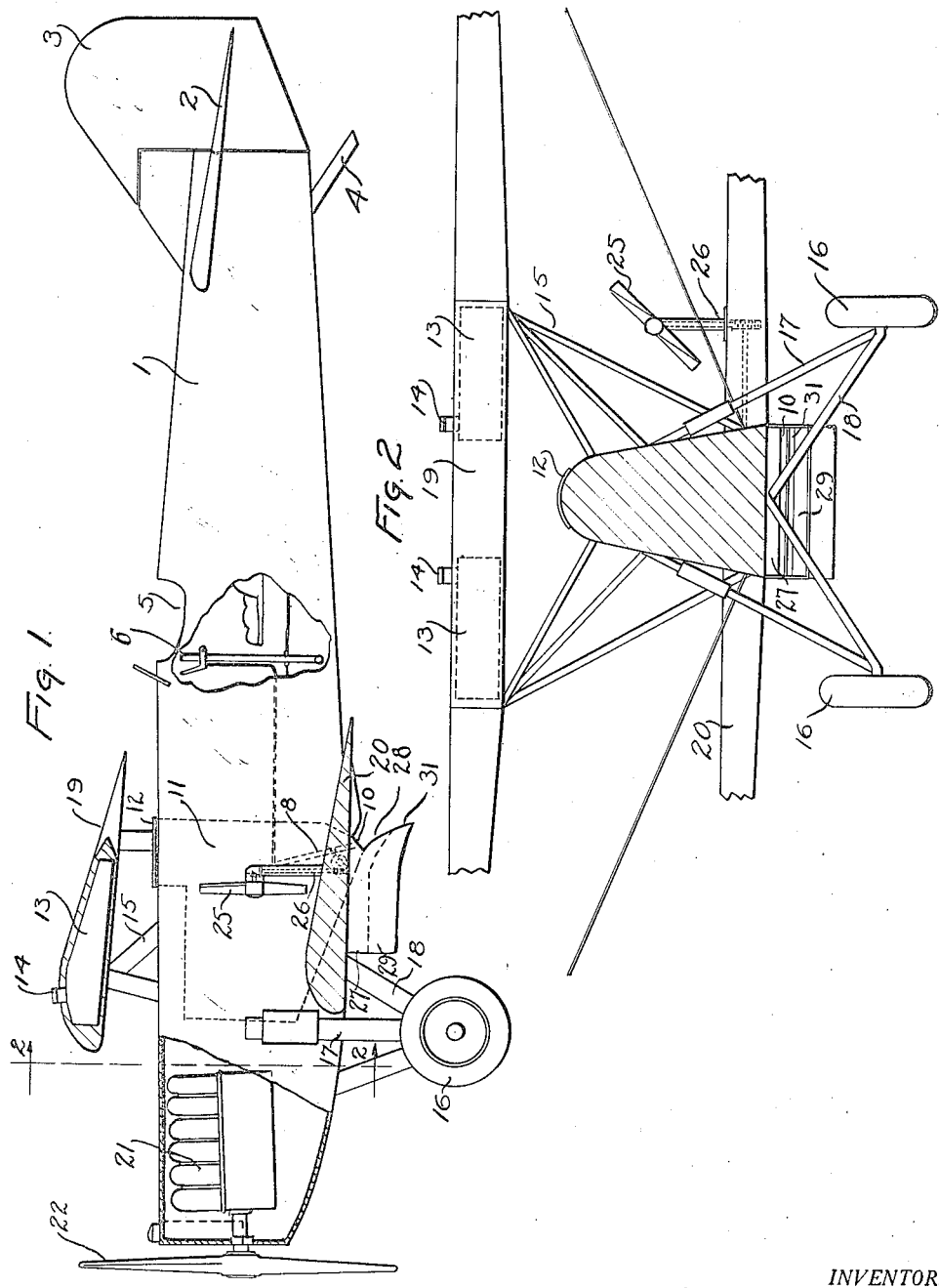

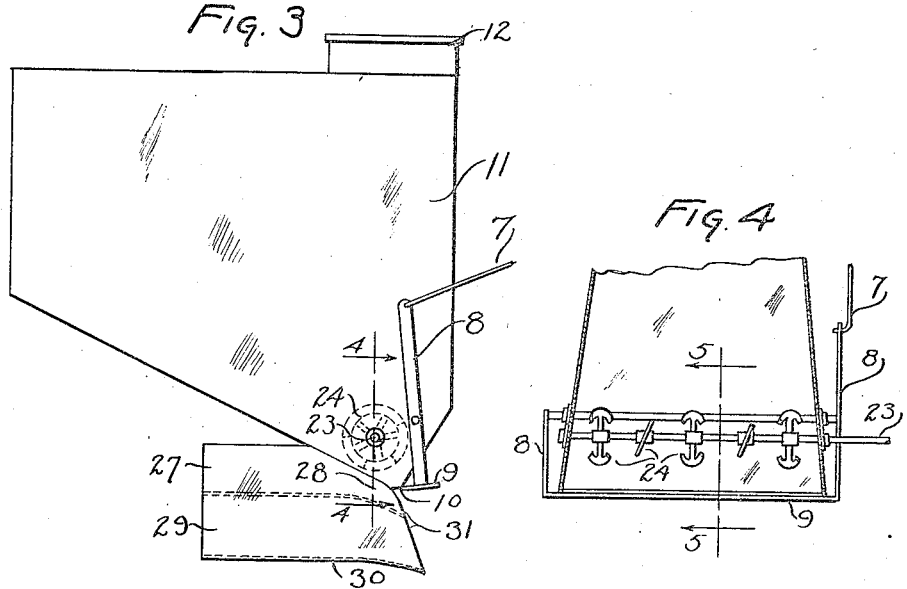
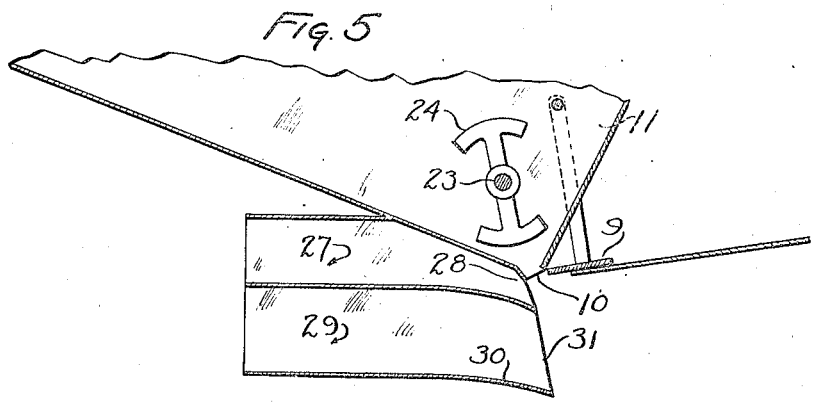
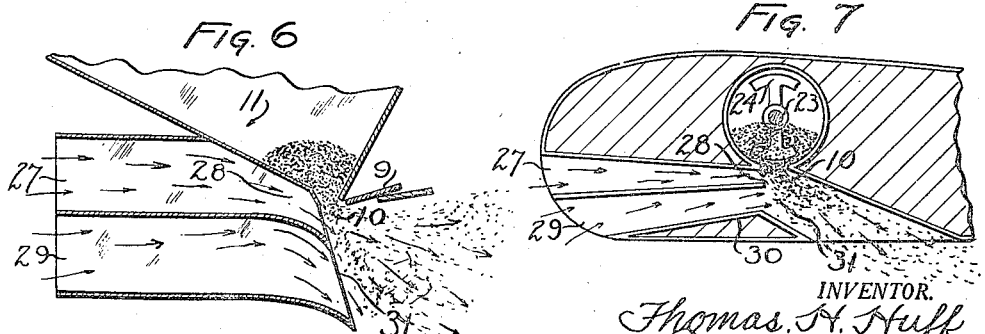

1,722,467

UNITED STATES PATENT OFFICE.

THOMAS H. HUFF, OF OGDENSBURG, NEW YORK, ASSIGNOR TO KEYSTONE AIRCRAFT CORPORATION, A CORPORATION OF DELAWARE.

DUSTING APPARATUS.

Application filed June 16, 1924. Serial No. 720,210.

My invention relates to dusting apparatus and in particular to such apparatus for installation and operation on airplanes.

It is the object of my invention to provide means of scattering uniformly fine particles or a spray of liquid from an airplane.

It is my object to provide a positively operated, readily controlled dusting or spraying apparatus for scattering such materials as calcium arsenate and similar materials, either dry or liquid.

It is my object to provide a hopper which is adapted for mounting in an airplane for readily loading and discharging and it is my object to provide a means of discharge and a means of scattering the discharged material, which will not necessitate any extra power or extra mechanism. It is an additional object of my invention to provide means of agitating the material prior to ejection through power supplied by an independent propeller.

It is my object to provide a means of carrying the material so that the weight when the container or hopper is loaded will not disturb the functioning of the plane, nor will the plane be disturbed as the material is gradually discharged.

It is a further object of my invention to provide an airplane, in which the discharge may be readily controlled from the hopper, in which there will be clear vision for the pilot due to the location of the wings, so that obstacles may be seen readily. It is an object to provide ready means of loading not only the hopper, but the gasoline tanks of the plane.

It is an additional object of my invention to provide in combination with the foregoing a landing gear that will not disturb vegetation, as such planes must frequently be used under conditions where an axle for the landing gear would materially impede the plane in its functioning.

It is one of the primary objects of the invention to use the passage of air by the plane to not only eject the material, but break it up in a fine cloud or spray and to spread it over a broad area.

It is obvious that the air may be taken in through the leading edge of a plane surface or below the plane surface. It is obvious the width of the eject orifice may be as wide as the fuselage, or if the material is contained in the wing, as well as the fuselage, it may be ejected any desired width. I desire to comprehend within my invention such modifications.

Referring to the drawings:

Figure 1 is a side elevation of my plane, showing it in normal flying position with the wings in section and the hopper and control mechanism for the hopper in dotted lines.

Figure 2 is a section on the line 2—2 of Figure 1, looking in the direction of the arrows.

Figure 3 is a side elevation of the hopper and control mechanism.

Figure 4 is a section on the line 4—4, looking in the direction of the arrows in Figure 3.

Figure 5 is a section on the line 5—5 of Figure 4.

Figure 6 is a similar section showing the method of ejection and disintegration or scattering.

Figure 7 is a similar view showing the method as applied in a wing structure.

Referring to the drawings in detail:

1 generally designates the tail portion of a plane having the elevators 2, the rudder 3, and the tail skid 4. 5 indicates the pilot's seat or cockpit, adjacent to which is the handle 6 of the control rod 7, which operates the lever 8, that in turn actuates the slide 9. This slide controls the opening 10 at the bottom of the hopper 11. It will be noted that this hopper is located just aft of the engine and has a filling opening 12. This opening is near the trailing edge of the upper wing or forward of it, so that a filling device can be easily inserted in the open mouth 12 for loading the hopper. The hopper slopes downwardly and backwardly to the rear of the landing gear.

The gasoline tanks are located as at 13 in the upper wing on either side of the fuselage and are filled through the filler openings 14. The wings and fuselage are tied together by the diagonal inter-plane struts 15. These struts are in the form of a self contained tripod that gives rigid support for the center section. These tripods take the lift, drag and transverse forces without the use of brace wires. The fuselage is connected to the landing wheels 16 by the shock absorbing struts 17 and the landing gear braces 18. This arrangement eliminates any axle between the wheels. 19 designates the upper wing and 20 the lower wing. The motor is located in the region designated 21 and is connected to the propeller 22. The motor is preferably tilted downward so that the line of thrust passes approximately through the center of gravity thereby reducing the stalling moment about the center of gravity. The wing is so arranged with a high angle of incidence that the plane can fly at horizontal position at dusting speeds, thus allowing the pilot to see forward over the fuselage and beneath the wing.

This is essential in this type of plane for the following reason: In applying a calcium arsenate dusting treatment to cotton, the plane must fly low over the fields, but be adapted to suddenly rise above obstructions such as trees and the like. It is therefore very essential that the pilot always have a clear vision ahead and also downwardly to see any obstructions.

Turning specifically to the hopper itself and the method of ejecting and breaking up the material into a fine dust or spray, I provide an agitator in the hopper consisting of a shaft 23 having a plurality of stirring arms 24. This shaft can be operated from the engine, but is preferably operated by a small independent propeller 25, working through shaft 26. There is a clutch in this shaft between the propeller 25 and the stirring arms 24, connecting it to the shaft 23, which actuates the stirring arms. This propeller is preferably located in the slip stream.

An air passageway 27 is provided either in the wing or below it, which passageway conveys the air through the orifice 28 at substantially right angles to the orifice 10, through which the material is descending. The passage of air by this orifice serves to draw the material through the orifice 10. A second passageway 29 is provided, which converges downwardly as at 30 to a restricted orifice 31, which is somewhat below the orifices 28 and 10 so that the material having been drawn out of the hopper by the suction of the air passing through 28 is scattered by the force of the air blast passing through the orifice 31. The lower orifice 31 is very much larger than the relatively small orifice 28.

It will be obvious that pipes or passageways may be located in the wing structure with their forward ends opening toward the front of the plane, as for instance in the leading edge thereof.

It will also be obvious that this method of drawing the material outwardly by the vacuum created through the passage of air over the mouth of the hopper and then scattering the material by a second blast of air on the material so drawn out may be applicable to gases, liquids, and solids.

In time of war such a method will be highly useful for smoke screens and for the application of gases and liquids or finely divided solids.

The hopper, as well as the fuselage, narrows towards the top, which gives increased visibility for the pilot without moving his body. This also has the advantage of clearing the hopper of dust because the negative slope of the walls to the hopper give a better flow than vertical walls. This also reduces the necessity for mechanical agitation on all but two sides, that is, the front and back.

The motor is preferably tilted downward so that the line of thrust passes approximately through the center of gravity so as to secure stability when the gasoline tanks are placed in the upper wing, thereby reducing the stalling moment about the center of gravity.

I desire to comprehend within my invention such modifications as may be necessary to adapt it to varying conditions.

Having thus fully described my invention, what I claim as new and desire to secure by Letters Patent, is:

1. In an airplane dusting apparatus, a hopper having an orifice for the descent of material therefrom, means to convey a blast of air in an angular downwardly descending path across the mouth of the hopper and downwardly therefrom to assist in the withdrawal of material from the hopper.

2. In an airplane dusting apparatus, a hopper having an orifice for the descent of material therefrom, means to convey a current of air at right angles thereto to assist in the withdrawal of material from the hopper, and a second means to convey a second current of air to scatter the material after it has been so withdrawn from the hopper.

3. In an airplane dusting apparatus, a hopper having an orifice for the descent of material therefrom, means to convey a blast of air at right angles thereto to assist in the withdrawal of material from the hopper, and a second means to convey a second blast of air to scatter the material after it has been so withdrawn from the hopper, the first blast of air being projected through a relatively small orifice close to the orifice of the hopper, while the second blast of air is conveyed through a relatively large orifice below the hopper orifice and the first air orifice.

4. In an airplane dusting apparatus, a hopper having an orifice for the descent of material therethrough, means to withdraw material from the hopper through the orifice by conveying a blast of air in a curved path converging with the path of descent of material through the hopper orifice.

5. In an airplane dusting apparatus, a hopper having an orifice for the descent of material therethrough, means to withdraw material from the hopper through the orifice by conveying a blast of air at a slight angle to the path of descent of material through the hopper orifice, and a second means for conveying a blast of air at right angles substantially to the descending material to scatter the material.

6. In a dusting apparatus, a hopper having an orifice for the descent of material therethrough, means to withdraw material from the hopper through the orifice by conveying a blast of air at a slight angle to the path of descent of material through the hopper orifice, and a second means for conveying a blast of air at right angles substantially to the descending material to scatter the material, and means to control the exit of the material through the hopper orifice.

7. In a dusting apparatus, a hopper having an orifice for the descent of material therethrough, means to withdraw material from the hopper through the orifice by conveying a blast of air at a slight angle to the path of descent of material through the hopper orifice, a second means for conveying a blast of air at right angles substantially to the descending material to scatter the material, means to control the exit of the material through the hopper orifice, and means to agitate the material in the hopper.

8. In an airplane, a hopper for containing dusting material, an opening in the bottom of the hopper towards which the material in the hopper runs, means for controlling said opening, means for causing the ejection of the material by air passing through a passageway to a point adjacent the hopper opening, and means to scatter the material beneath the plane by air conveyed to a point adjacent to where the material makes its exit.

9. In an airplane, a hopper for containing dusting material, an opening in the bottom of the hopper towards which the material in the hopper runs, means for controlling said opening, means for causing the ejection of the material by air passing through a passageway to a point adjacent the hopper opening, means to scatter the material beneath the plane by air conveyed to a point adjacent where the material makes its exit, said hopper opening extending the width of the fuselage and hopper.

10. In an airplane, a hopper for containing dusting material, an opening in the bottom of the hopper towards which the material in the hopper runs, means for controlling said opening, means for causing the ejection of the material by air passing through a passageway to a point adjacent the hopper opening, means to scatter the material beneath the plane by the air conveyed to a point adjacent where the material makes its exit, said hopper opening extending the width of the fuselage and hopper, and means for loading the hopper at the top of the fuselage and rearwardly and below the wing structure.

11. In an airplane for containing dusting material, means to pneumatically eject the material and means for pneumatically scattering the material, said plane having upper and lower wing surfaces, and the hopper being located therebetween, and the place of exit of the material being located beneath the fuselage and lower wing.

12. In an airplane for containing dusting material, means to pneumatically eject the material and means for pneumatically scattering the material, said plane having upper and lower wing surfaces, and the hopper being located therebetween, the place of exit of the material being located beneath the fuselage and lower wing, and a landing gear having landing wheels located to either side of the fuselage and the area of the ejection of the material, said landing gear consisting of diagonal struts and shock absorbing members, whereby the axle between the wheels is eliminated.

13. In an airplane for spreading materials, a fuselage, upper and lower wing surfaces, a hopper located between said wing surfaces in the fuselage having an exit opening the width of the fuselage, wings with a high angle of incidence to permit the maximum vision of the pilot, a pilot's cockpit behind the wings and an engine so located that the plane will have the fuselage in the horizontal when in flight, said fuselage being arranged to taper inwardly as it progresses upwardly.

14. In an airplane, an engine located with its forward end lower than the rear end with respect to the normal line of the fuselage, gasoline tanks in the upper wing, a fuselage broader at the base than at the top, and a hopper of similar dimensions to the fuselage in cross-section having a loading opening at the top, a sloping bottom, and an exit opening at the bottom to the rear of the hopper the width of the fuselage.

In testimony whereof, I affix my signature.

THOMAS H. HUFF.